United States Patent
Uchino et al.

[11] Patent Number: 5,955,820
[45] Date of Patent: Sep. 21, 1999

[54] ULTRASONIC MOTOR

[75] Inventors: Kenji Uchino; Burhanettin Koc, both of State College, Pa.

[73] Assignee: The Penn State Research Foundation, University Park, Pa.

[21] Appl. No.: 09/044,351

[22] Filed: Mar. 19, 1998

Related U.S. Application Data

[60] Provisional application No. 60/041,178, Mar. 21, 1997.

[51] Int. Cl.$^6$ ...................................................... H02N 2/00
[52] U.S. Cl. .................. 310/323.04; 310/323.05
[58] Field of Search ...................................... 310/323, 328

[56] References Cited

U.S. PATENT DOCUMENTS

| | | | |
|---|---|---|---|
| 4,999,819 | 3/1991 | Newnham et al. | 367/157 |
| 5,254,899 | 10/1993 | Suzuki et al. | 310/323 |
| 5,276,657 | 1/1994 | Newnham et al. | 367/157 |
| 5,296,776 | 3/1994 | Wind et al. | 310/323 |
| 5,418,417 | 5/1995 | Luthier et al. | 310/323 |
| 5,446,331 | 8/1995 | Watanabe et al. | 310/323 |
| 5,473,215 | 12/1995 | Luthier | 310/323 |
| 5,854,528 | 12/1998 | Nidhikura et al. | 310/323 |

*Primary Examiner*—Thomas M. Dougherty
*Attorney, Agent, or Firm*—Thomas J. Monahan

[57] ABSTRACT

An improved motor employs a stator which includes a piezoelectric wafer that is poled across its thickness dimension so that a signal applied thereacross results in either an inward or outward movement of the periphery of the wafer. A pair of end caps are placed on opposed surfaces of the wafer and are adhered thereto at their respective peripheries. Each end cap includes a centrally located driving segment, a series of peripheral segments adhered to periphery of the wafer and a plurality of arms connecting the peripheral segments to the driving segment. A rotor includes a driven portion which mates with the driving segment and is driven thereby. Application of a signal across the thickness of the piezoelectric wafer results in rotary motion being imparted to the driving segment via flexure of the arms (as a result of movement of the peripheral segments of the end caps). Further embodiments provide both rotary and linear motions.

15 Claims, 13 Drawing Sheets

ULTRASONIC MOTOR

This Application claims priority from Provisional Application Ser. No. 60/041,178, filed Mar. 21, 1997.

FIELD OF THE INVENTION

This invention relates to ultrasonic motors and, more particularly, to an ultrasonic motor wherein a rotational and/or a linear movement is generated by means of a piezoelectric effect upon a metal-ceramic composite driving element.

BACKGROUND OF THE INVENTION

Metal-ceramic composite structures have been utilized for both sensing and actuation applications. In U.S. Pat. Nos. 4,999,819 and 5,276,657 to Newnham et al., a central piezoelectric wafer has metal end caps adhered to the peripheries of either surface of the piezoelectric wafer. The piezoelectric wafer is poled across its thickness dimension so that application of a voltage thereacross results in a radially directed movement of the wafer's circumference and a concurrent flexure of the attached end caps. Further, application of a force to the end caps causes a voltage to be induced across the piezoelectric wafer.

In an actuator embodiment, application of a voltage across the piezoelectric wafer causes a radially directed inward movement of the circumference of the wafer, thereby causing a distortion of the end caps and a resultant movement of an actuation surface thereof. In a sensor embodiment, application of a pressure to the end caps is translated through the joinder thereof to the wafer into a physical distortion of the wafer which, in turn, induces an output voltage proportional to the applied pressure. In both of the embodiments, the end caps either (i) respond to a lateral movement of the piezoelectric wafer by moving in a direction orthogonal to the surface of the wafer (actuator) or (ii) respond to an applied pressure in the orthogonal direction by stressing the wafer (sensor). Neither device has the capability of producing movements in the rotary direction or responding thereto.

The prior art includes teachings relating to the structure and operation of ultrasonic motors. U.S. Pat. No. 5,254,899 to Suzuki et al. discloses an ultrasonic motor which employs traveling wave bending modes that are excited on a ring-type unimorph piezoelectric element. Conventional ultrasonic motor designs evidence complex structures. Further, the traveling wave type ultrasonic motor requires plural power supplies, one for a sine voltage and one for a cosine voltage.

U.S. Pat. No. 5,296,776 to Wind et al. describes timepiece motor which utilizes a piezoelectrically driven rotor to incrementally rotate within a fixed stator arrangement.

It is an object of this invention to provide an improved ultrasonic motor which evidence's a simple and inexpensive design.

It is another object of his invention to provide an improved ultrasonic motor which is capable of providing both rotary and linear motions.

SUMMARY OF THE INVENTION

An improved motor employs a stator which includes a piezoelectric wafer that is poled across its thickness dimension so that a signal applied thereacross results in either an inward or outward movement of the periphery of the wafer. A pair of end caps are placed on opposed surfaces of the wafer and are adhered thereto at their respective peripheries. Each end cap includes a centrally located driving segment, a series of peripheral segments adhered to periphery of the wafer and a plurality of arms connecting the peripheral segments to the driving segment. A rotor includes a driven portion which mates with the driving segment and is driven thereby. Application of a signal across the thickness of the piezoelectric wafer results in rotary motion being imparted to the driving segment via flexure of the arms (as a result of movement of the peripheral segments of the end caps).

In the preferred embodiment, the peripheral segments of the opposed end caps are displaced from each other by 45 degrees, thus enabling transfer of radial vibrations into longitudinal and angular vibrations. The combination of these vibrations result in an elliptical motion at the periphery of the piezoelectric wafer which, in turn, is translated by the arms into rotary motion of the driving segment. Further embodiments provide both rotary and linear motions.

BRIEF DESCRIPTION OF THE DRAWINGS

FIG. 3b shows a side view of the end cap of FIG. 3a.

FIG. 5b shows a side view of the end cap of FIG. 5a.

FIG. 6b shows a side view of the end cap of FIG. 6a.

DETAILED DESCRIPTION OF THE PREFERRED EMBODIMENTS

Figure 1:
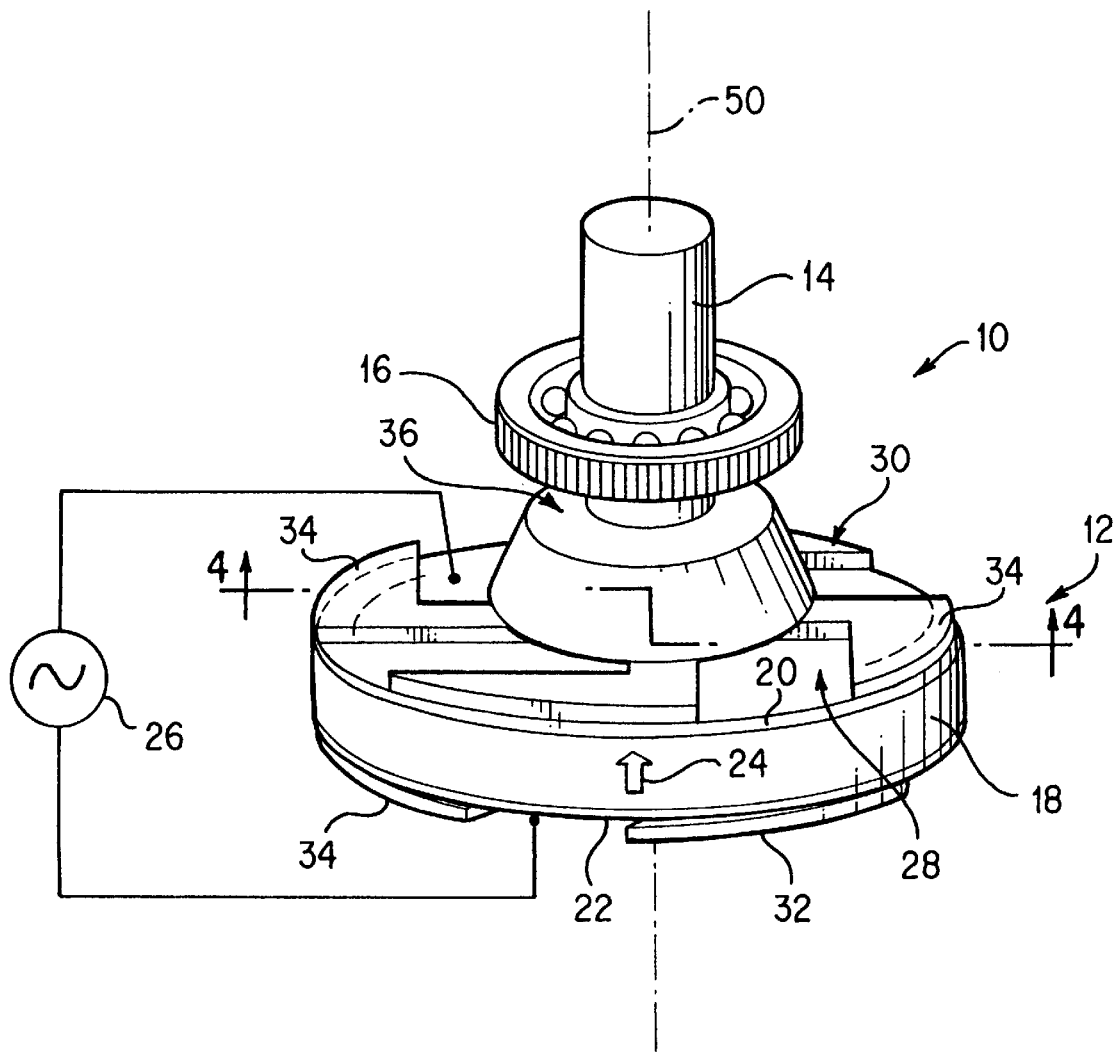
FIG. 1 is a perspective view showing a rotary ultrasonic motor in accordance with the invention.

FIG. 1 shows a perspective view of a rotary ultrasonic motor 10 constructed in accordance with the invention. Motor 10 comprises a stator structure 12, a rotor 14 and a rotor bearing 16. Stator structure 12 comprises a piezoelectric wafer 18 having electrodes 20 and 22 emplaced on opposite faces thereof. It is preferred that piezoelectric wafer 18 be shaped in the form of an annulus or ring; however, wafer 18 can also be in the form of a continuous disk, while such structure is less preferred. Wafer 18 is poled across its thickness dimension as shown by arrow 24. Preferred materials for piezoelectric wafer 18 comprise the class of lead zirconate titanates.

An AC signal source 26 is connected between electrodes 22 and 20 and provides a pulsed signal voltage across piezoelectric ring 18. As is known to those skilled in the art, application of such a voltage across piezoelectric ring 18 causes alternate expansion and contraction thereof in its radial dimensions (see arrow 28). The pulsed signal applied from source 26 is preferably adjusted to a frequency which approximates the radial mode resonance frequency of stator structure 12. In such manner, a maximum amount of ring distention is accomplished so as to achieve substantial distortion of end caps 30 and 32 (whose effect on rotor 14 will be described below).

End caps 30 and 32, preferably comprised of resilient metal, are positioned on opposed major surfaces of piezoelectric ring 18 and each comprises a plurality of outer peripheral segments 34 which are, respectively, bonded to the outermost regions of electrodes 20 and 22, and piezoelectric ring 18. Note that each outer peripheral segment 34 is preferably bonded at its outermost points of contact with the respective electrodes, leaving the remainder of the peripheral segments free to move and flex. It is to be noted, that the upper and lower end caps shown in the embodiment of FIG. 1 are offset by 45° in orientation from each other.

Figure 2:
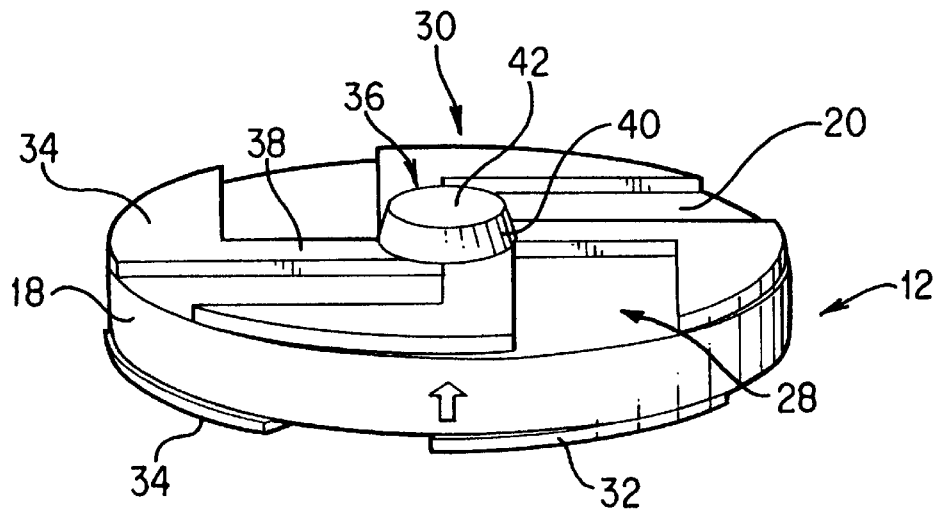
FIG. 2 shows a perspective view of the stator element of the ultrasonic motor of FIG. 1.
Figure 3A:
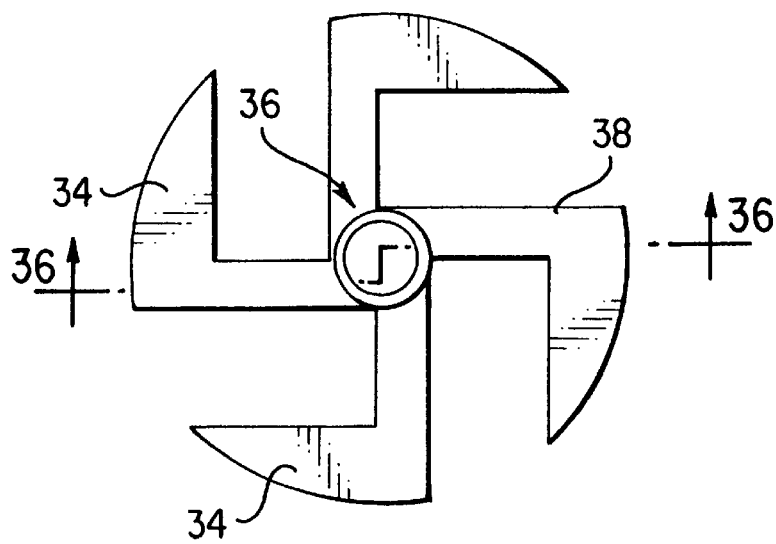
FIG. 3a shows a top view of an end cap of the ultrasonic motor of FIG. 1.
Figure 3B:
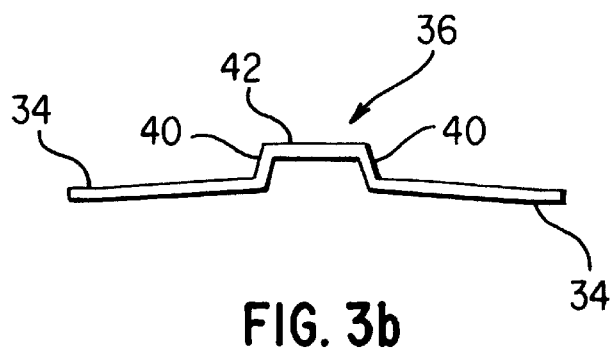

FIG. 2 is a perspective view of stator structure 12, with rotor 14 removed. Each outer peripheral segment 34 of end cap 30 is joined to a central driving segment 36 via an arm 38. A plan view of end cap 30 is shown in FIG. 3a and a sectional view thereof, taken along line 3b—3b is shown in FIG. 3b. Driving segment 36 preferably takes the form of a truncated cone having side walls 40 and a top section 42.

Figure 4:
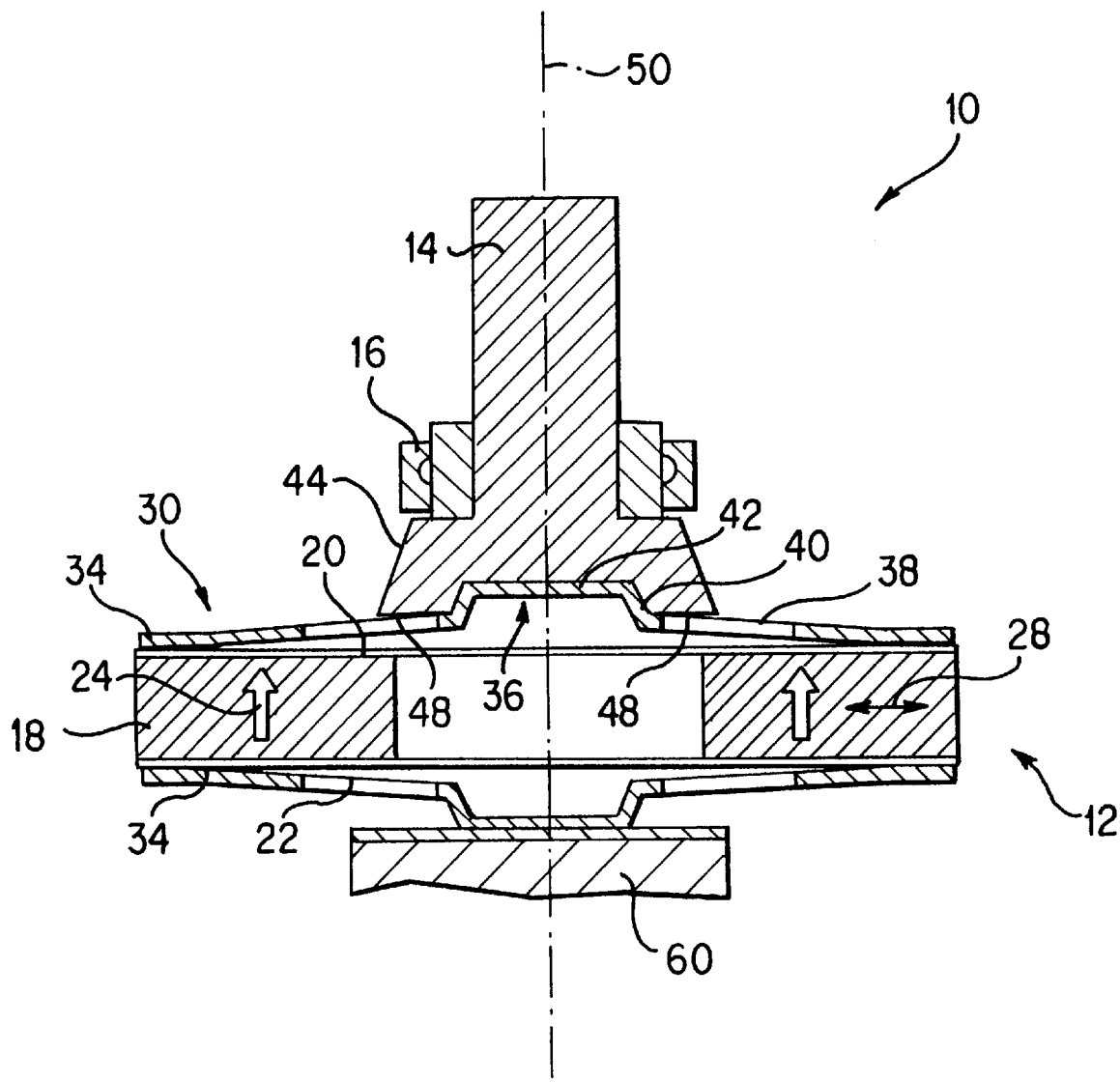
FIG. 4 shows a cross-sectional view of the ultrasonic motor of FIG. 1.

FIG. 4 is a sectional view of motor 10 taken along line 4—4 in FIG. 1. Rotor 14 includes a driven segment 44 which fits over and mates with driving segment 36 of end cap 30. As indicated above, driving segment 36 takes the form of a truncated cone and, when mated with driven segment 44, tends to center stator 12 and rotor 14 along center line 50. Further, side walls 40 and top section 42 of driving segment 32 interact with the interior surfaces of driven segment 44 to control rotation of rotor 14. Such rotation occurs due to frictional interaction (i) between the inside surface of driven segment 44 and the outer surfaces of driving segment 36, and (ii) at contact surface 48 between the lower surface of driven segment 44 and the upper surface of arms 38.

Figure 5A:
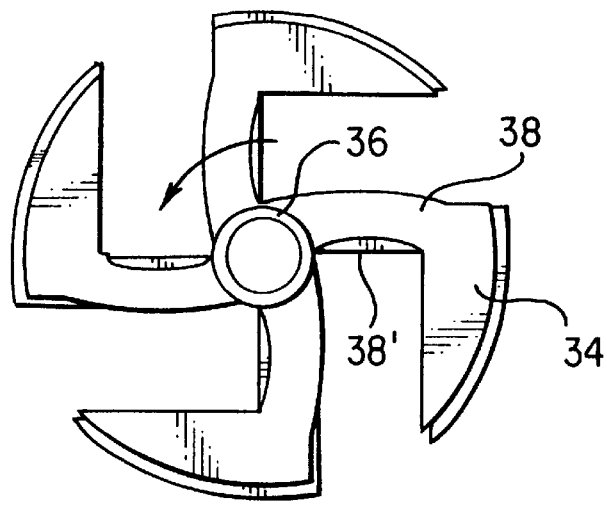
FIG. 5a shows a top view of the end cap of FIG. 3 when it is subjected to a radial shrinking motion of the piezoelectric wafer.
Figure 5B:
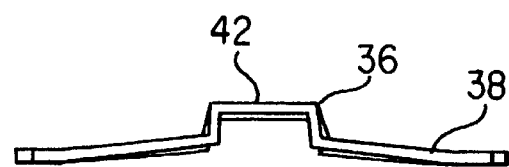
Figure 6A:
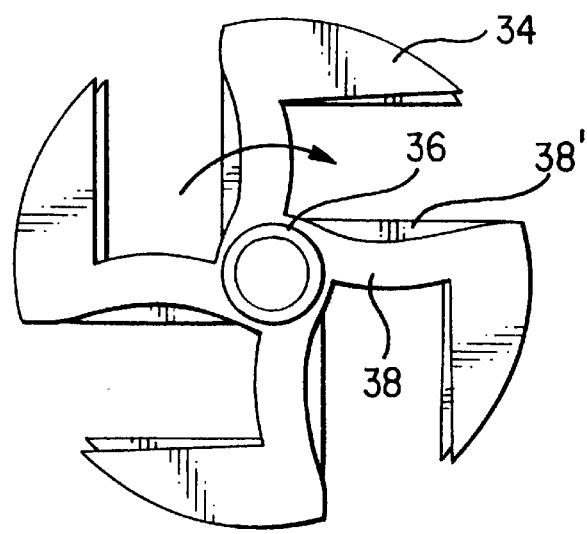
FIG. 6a shows the top view of the end cap of FIG. 3 when it is subjected to a radial expansion motion of the piezoelectric wafer.
Figure 6B:
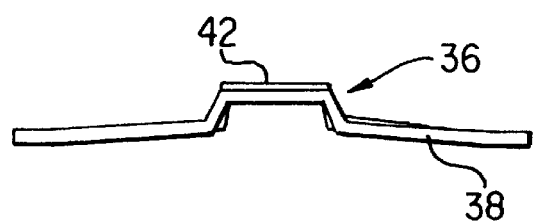

The driving action will be better appreciated by referring to FIGS. 5 and 6 in conjunction with FIG. 4. FIGS. 5a and 5b illustrate the distortions of arms 38 and driving segment 36 when piezoelectric ring 18 is caused to shrink in its radial direction as a result of an applied voltage. When no power is applied, arms 38' reside in their unstressed state. When an appropriate voltage is applied between electrodes 20 and 22, piezoelectric ring 18 shrinks along its radial dimension and peripheral segments 34 exert a distorting torque on arms 38, causing them to bow in a counterclockwise direction. This action causes driving segment 36 to rotate counterclockwise by a small amount (e.g. 1–2°).

Referring to FIG. 4, the distortion of arms 38 cause top section 42 of driving segment 36 to be driven upwardly, causing driven segment 44 to be likewise driven in an upward direction. This action causes a separation between the uppermost surfaces of arms 38 and lowermost surface of driven segment 44. Accordingly, a substantial lessening of the frictional engagement between driven segment 44 and driving segment 36 is experienced.

By contrast (see FIGS. 6a and 6b), when an oppositely poled voltage is applied across electrodes 20, 22, arms 38' are caused to bow in a clockwise direction by the torque exerted thereon by the outward movements of peripheral segments 34. Such action causes (see FIG. 6b) upper section 42 of driving segment 36 to move downward, thereby enabling contact surface 48 to drive driven segment 44 (via frictional engagement with arms 38) in a clockwise direction. As AC source 26 is operated at an ultrasonic frequency (e.g. 128 kHz), the continuously applied signal pulses cause clockwise rotation of driven segment 44 and rotor 14 due to the periodic frictional engagement therebetween.

Motor structure 10 is preferably housed in an enclosure having an end wall 60 (only partially shown in FIG. 4). End wall 60 exhibits an acoustic impedance that is different from the material of end caps 32 so as to enable vibrations to be reflected back into stator structure 12. The acoustic mismatch between surface 60 and end cap 32 enables such acoustic reflections.

Figure 7:
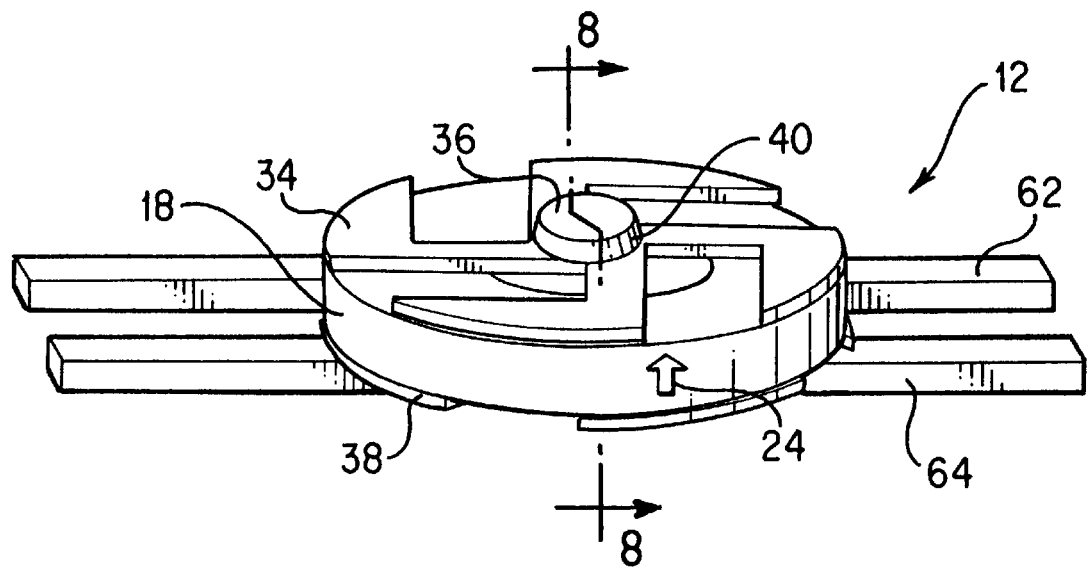
FIG. 7 is a perspective view of the linear ultrasonic motor in accordance with the invention.
Figure 8:
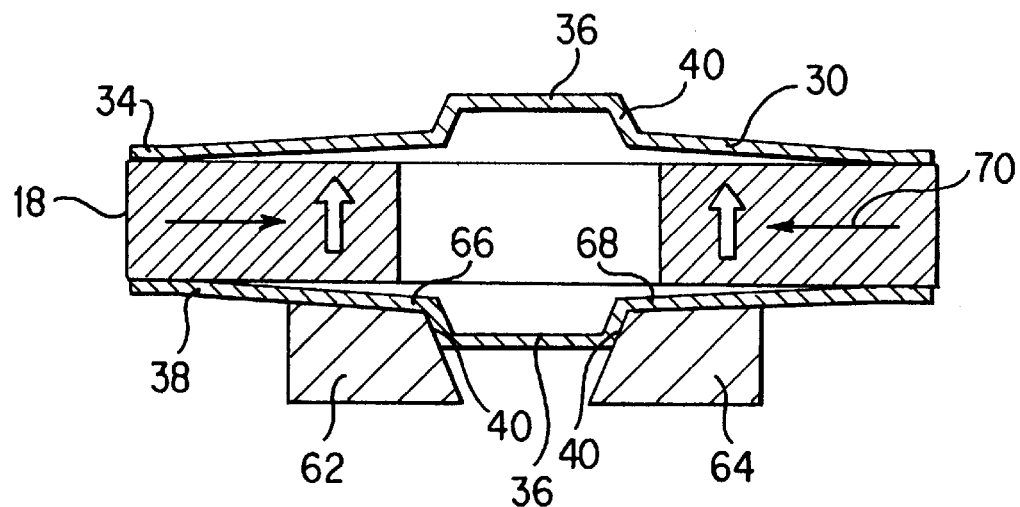
FIG. 8 shows a cross-sectional view of the linear ultrasonic motor of FIG. 7.

Turning now to FIG. 7, stator structure 12 is shown mounted on a pair of rails 62 and 64. FIG. 8 is a sectional view of the structure of FIG. 7, taken along line 8—8. The motor structure shown in FIGS. 7 and 8 provides a linear drive action of stator structure 12 along rails 62 and 64. In this configuration, when arms 38 are in their relaxed position, there is lessened surface contact between them and rail surfaces 66 and 68 due to a stand-off affect created by the diameter of driving segment 36 being made slightly larger than the distance between rails 62 and 64. When, however, piezoelectric ring 18 is caused to shrink in the direction indicated by arrows 70, the diameter of driving segment 36 constricts, enabling greater frictional contact between arms 38 and rail surfaces 66 and 68, along the contact length thereof. Accordingly, rotor structure 12 tends to move along rails 62 and 64 in accordance with the drive signal polarity which results in the aforementioned interaction between arms 38 and rail surfaces 66, 68, respectively.

Figure 9:
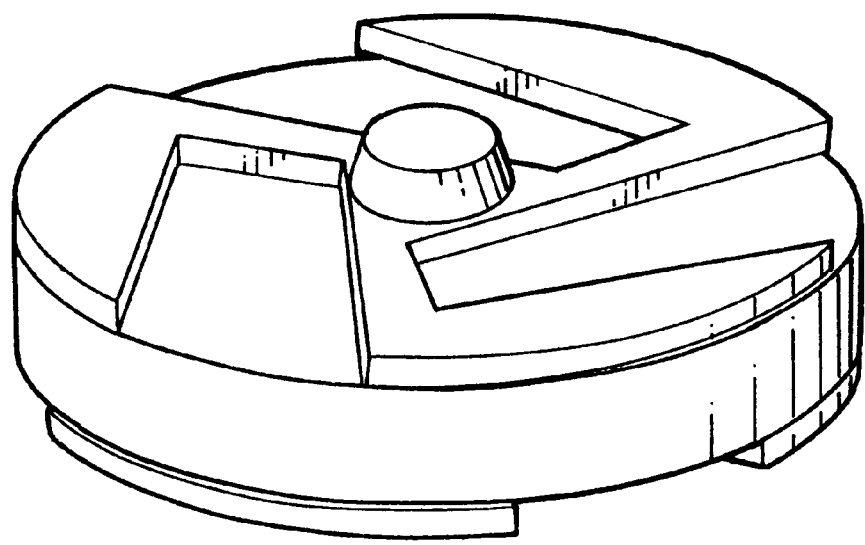
FIG. 9 shows a perspective view of a stator employing an end cap with three slotted actuator arms.
Figure 10:
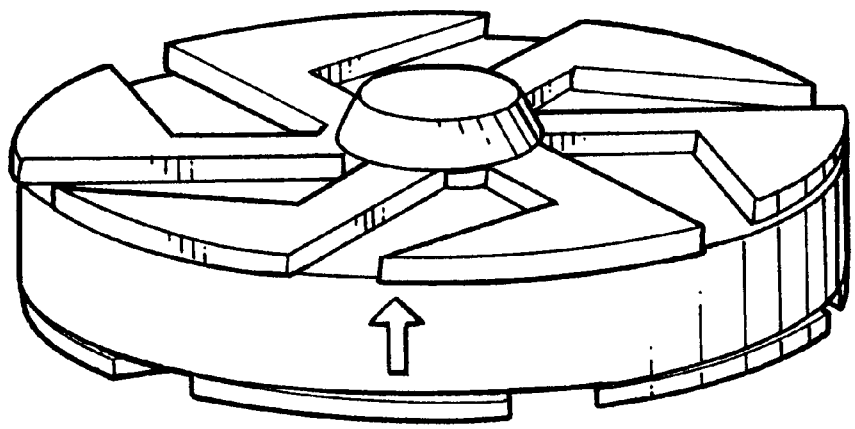
FIG. 10 shows a perspective view of a stator end cap with six slotted actuator arms.

FIGS. 9 and 10 illustrate perspective views of stator structures which utilize end caps having three arms and six arms, respectively. It is to be noted, that while the upper and lower end caps shown in the embodiment of FIG. 1 are offset by 45°, in the configuration of FIG. 9, the upper and lower end caps are offset from each other by 60° and, as shown in FIG. 10, by 30°. Otherwise, the operation of the structures shown in FIGS. 9 and 10 is identical to that described above.

Figure 11A:
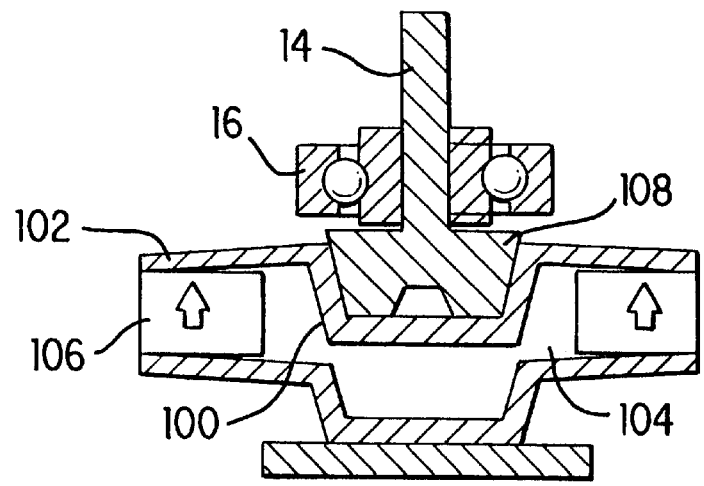
FIG. 11a shows a cross-section of a second embodiment of a rotary ultrasonic motor in accordance with the invention.
Figure 11B:
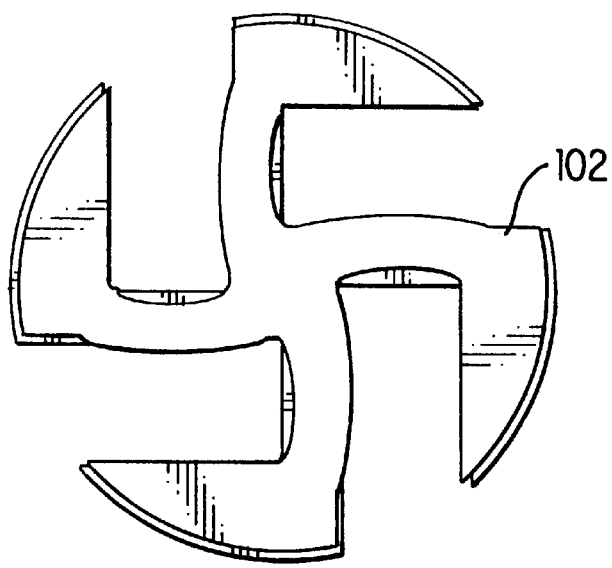
FIG. 11b shows a top view of the end cap used in the embodiment of FIG. 11a, when the piezoelectric wafer shrinks in a radial direction.
Figure 11C:
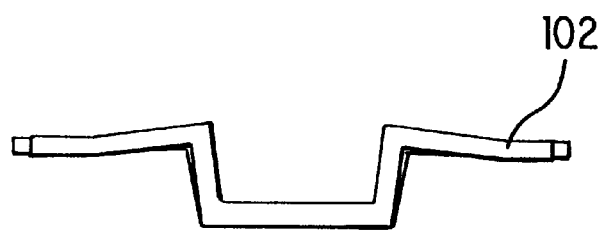
FIG. 11c shows a side view of the end cap of FIG. 11b.

Turning now to FIGS. 11a–11c, a further embodiment of the invention is illustrated wherein a driving segment 100 of end cap 102 is recessed into center aperture 104 within piezoelectric ring 106. Driven segment 108 of rotor 14 mates with driving segment 100 of end cap 102 as shown. Application of an excitation signal to piezoelectric ring 106 causes a distortion of the arms of end cap 102 in the manner shown in FIG. 11b. Note that when piezoelectric ring 104 shrinks in diameter, the interior surfaces of driving segment 100 tend to move towards one another, thereby gripping driven segment 108 more firmly and causing it to rotate in a counter-clockwise direction.

When piezoelectric ring 104 is caused to expand outwardly, the gripping action of driving segment 100 is released, reducing its frictional engagement with driven segment 108 and enabling rotor 14 to remain in place until a next signal pulsation is applied to piezoelectric ring 106.

Figure 12A:
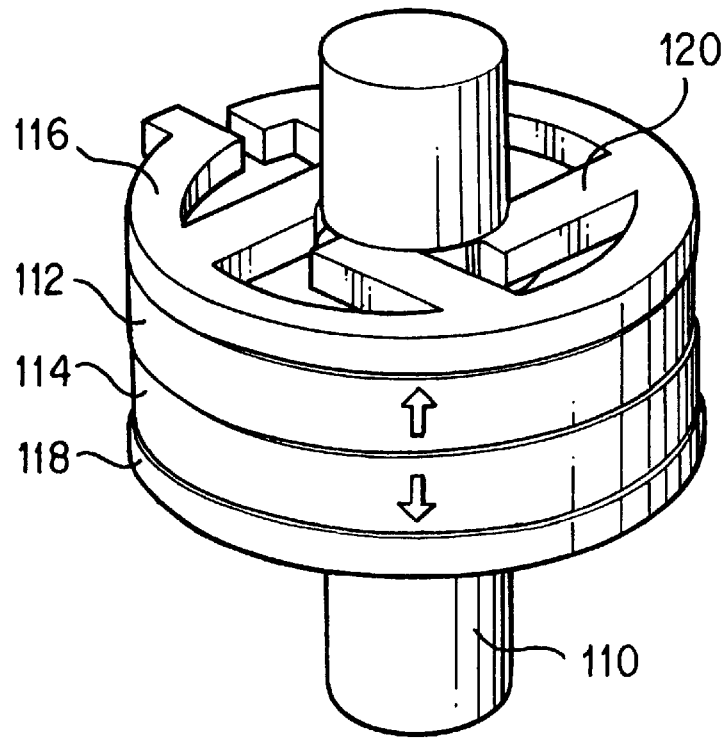
FIG. 12a shows a perspective view of a third embodiment of an ultrasonic motor constructed in accordance with the invention.
Figure 12B:
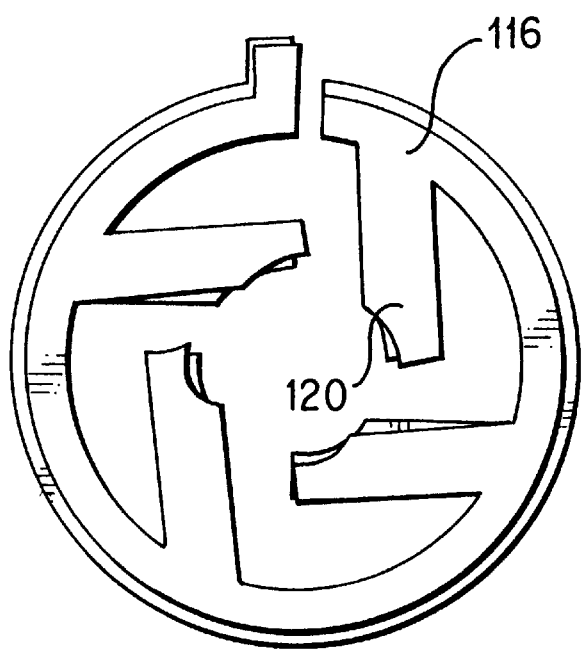
FIG. 12b shows the movement of the end cap used with the with the embodiment of FIG. 12a, when the piezoelectric wafer shrinks in a radial direction.

Referring to FIGS. 12a and 12b, a further embodiment of an ultrasonic motor embodying the invention is illustrated. In this arrangement, a cylindrical rod 110 is utilized as the rotor and a pair of oppositely poled piezoelectric rings 112 and 114 are bonded to each other. A pair of end caps 116 and 118 are bonded concentrically to the top and bottom surfaces of piezoelectric rings 112 and 114 in the manner described above. Each of end caps 116 and 118 is provided with a plurality of inwardly directed arms 120.

A planar view of end cap 116 is shown in FIG. 12b. The ends of arms 120 are shaped in a concave manner so as to closely mate with the external surface of rotor 110. In the same manner as described for the motor structure of FIG. 1, only the external edges of end caps 116 and 118 are bonded to their respective supporting piezoelectric rings. Accordingly, when piezoelectric rings 112 and 114 are driven in such a manner as to shrink in diameter, the concave portions of arms 120 act to drive rotor 110, causing it to rotate. By contrast, when piezoelectric rings 112 and 114 expand in diameter, arms 120 are released from contact with rotor 110.

More specifically, as shown in FIG. 12b, shrinkage of diameter of the outer peripheral portion of end cap 116 causes a slight counterclockwise movement of arms 120 which, via frictional engagement tends to drive rotor 110 in a clockwise direction. Upon expansion of piezoelectric rings 112 and 114, arms 120 return to their original position, awaiting a next excitation cycle.

Figure 13A:
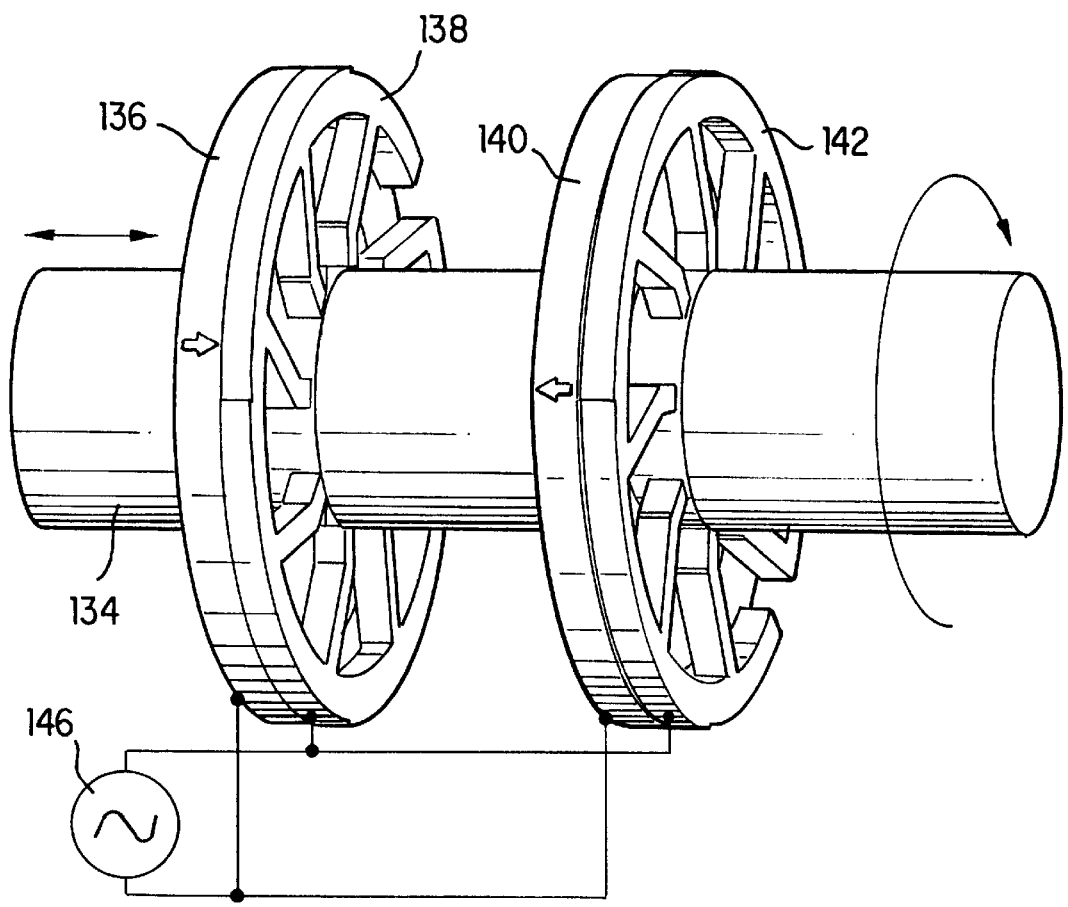
FIG. 13a shows a perspective view of a further embodiment of an ultrasonic motor arrangement in accordance with the invention hereof which provides both rotational and linear motion.
Figure 13B:
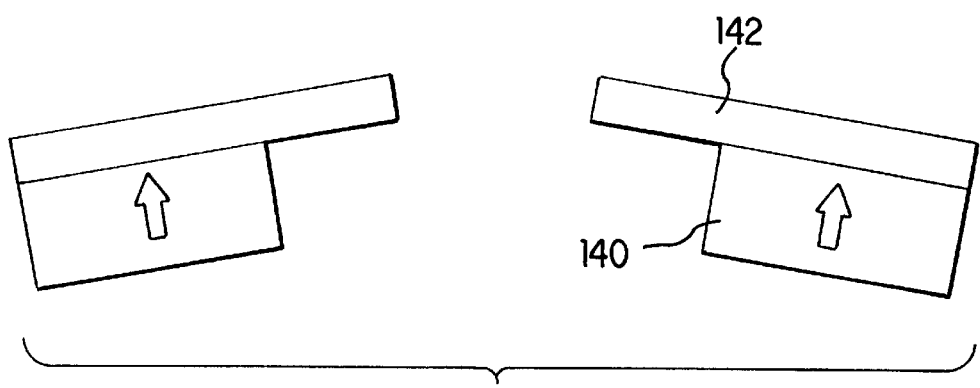
FIG. 13b shows a side sectional view of a piezoelectric ring used in the stator of the motor of FIG. 14a, when an energizing signal is applied thereacross.

FIGS. 13a and 13b show a single-phase driven roto-linear ultrasonic motor arrangement which includes a rotor 134. Stator structure 130 includes a piezoelectric ring 136 that is bonded to an end cap 138, and stator structure 132 includes a piezoelectric ring 140 which is bonded to an end cap 142. Note that the thickness of end cap 138 is different from end cap 142, thereby causing each stator structure to exhibit a different resonant frequency. Piezoelectric rings 130 and 132 are poled in opposing directions and encircle rotor 134 which passes therethrough. A single signal source 146 drives both piezoelectric rings 136 and 140, but in opposition.

Assuming signal source 146 exhibits an output frequency that is equal to the resonance frequency of stator structure 130, piezoelectric ring 136 is excited at a radial mode resonance frequency which causes the inwardly directed arms of end cap 138 to flex and cause a rotational movement of rotor 134, as described for the embodiment of FIG. 12. By contrast, if the resonance frequency of stator structure 132 is arranged such that it is about one-half the frequency of signal source 146, piezoelectric ring 140 is excited at its first flexural mode resonance frequency. Such flexure causes a cup-like distortion of piezoelectric ring 140, as shown in FIG. 13b. The resulting deflection of the inner diameter of piezoelectric ring 140 causes the inwardly directed arms 148 of end cap 142 to be flexed in a direction which causes a longitudinal movement of rotor 134.

Accordingly, to obtain clockwise rotation, stator structure 130 is excited at its radial mode resonance frequency and stator structure 132 is excited at an off-resonance frequency so as to generate a small displacement of rotor 134 along its axis. A linear motion in the right direction can be obtained if stator structure 130 is excited at its first flexural mode. Recall that the first flexural mode is excited when an applied signal exhibits a frequency that is about one-half the frequency required to excite the radial resonance mode. Stator structure 132 can cause rotor 134 to rotate in the counter-clockwise direction or move towards the left if it is excited at its radial mode resonance frequency or first flexural mode resonance frequency, respectively. Thus, dual direction linear motions and dual direction rotary motions can be achieved from the motor structure shown in FIG. 13.

Figure 14:
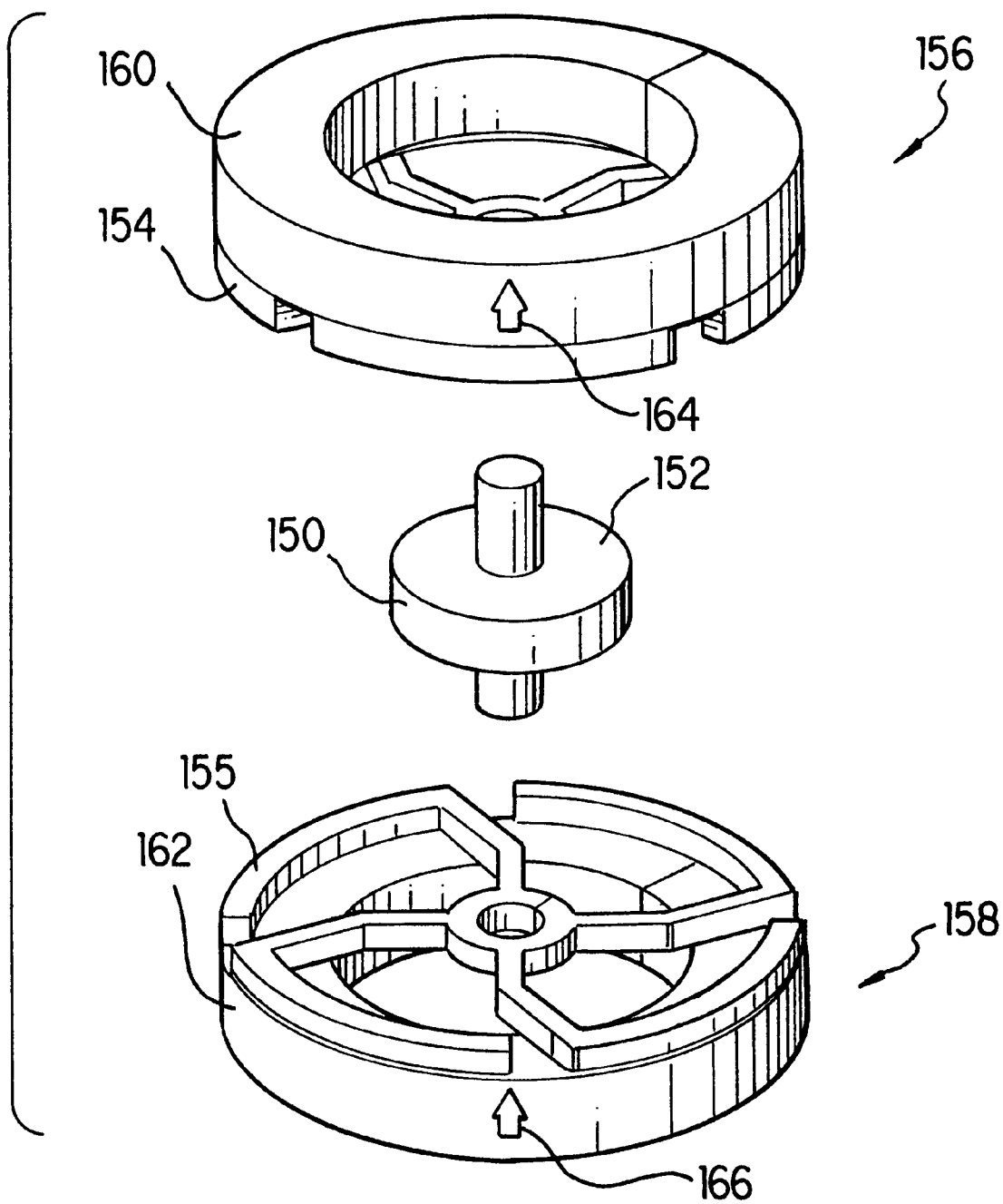
FIG. 14 shows an exploded perspective view of a further ultrasonic motor embodiment incorporating the invention hereof.

Referring now to FIG. 14, a further single phase-driven ultrasonic motor arrangement is disclosed. Rotor 150, in this arrangement, rotates due to frictional interaction between the top and bottom surfaces of cylindrical segment 152 and the touching surfaces of end caps 154 and 155, respectively. The thickness of end cap 154 is different from that of end cap 155, assuring that stators 158 and 160 exhibit different resonance frequencies. Piezoelectric rings 160 and 162 are poled as shown by arrows by 164 and 166, respectively. Further, as described above, only the peripheral segments of end caps and 154 and 155 are bonded to piezoelectric rings 169 and 162, respectively.

If piezoelectric ring 160 is excited at a frequency equal to the radial mode resonance frequency of stator 156, the flexure of the arms of end cap 154 causes rotor 150 to rotate in a counterclockwise direction. Note that when a stator is excited at other than its resonant frequency, whatever radial movement occurs is but a fraction of that experienced when the exciting signal is at the resonant frequency of the stator. A clockwise rotation of rotor 150 can be obtained by exciting stator 158 at its radial mode frequency. In either case, flexure of the arm segments of each of end caps 154 and 155 is transferred into torsional displacement of rotor 150 by frictional engagement with the upper and lower surfaces of cylindrical segment 152.

EXPERIMENTAL

An ultrasonic motor taking the configuration shown in FIG. 1 was constructed having the following dimensions:

Outer diameter of the piezoelectric disk: 12.7 mm

Thickness of the piezoelectric disk: 0.5 mm

Thickness of metal end cap (phosphor bronze or brass): 0.2 mm

Diameter of inner circular part of end cap: 4.0 mm

Height of truncated conical part of end cap: 0.7 mm

The piezoelectric ceramic material utilized was PZT8d and the stator radial mode resonance frequency was found to be approximately 140 kHz, in the free state. After mounting the stator inside a housing unit, the motor was driven at 128 kHz, at 40 to 100 volts, peak-to-peak. The decrease in resonance frequency was due to a pre-stress applied on the outer side of the rotor bearing to keep the rotor and stator together.

Figure 15A:
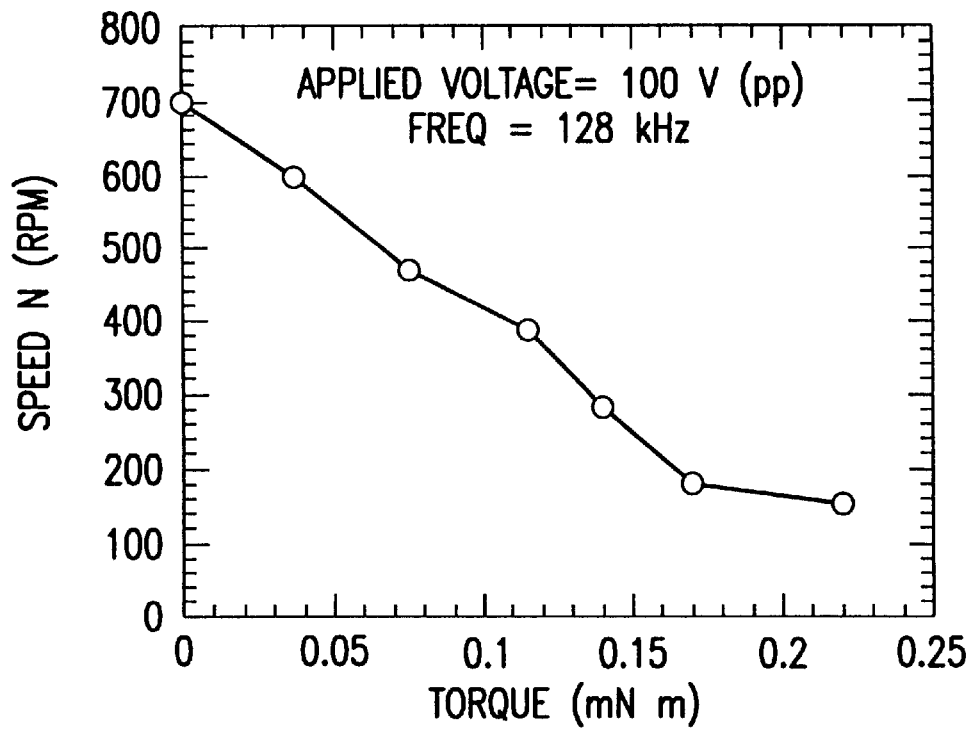
FIG. 15a shows a plot of speed vs. torque for an ultrasonic motor constructed in accordance with the invention.
Figure 15B:
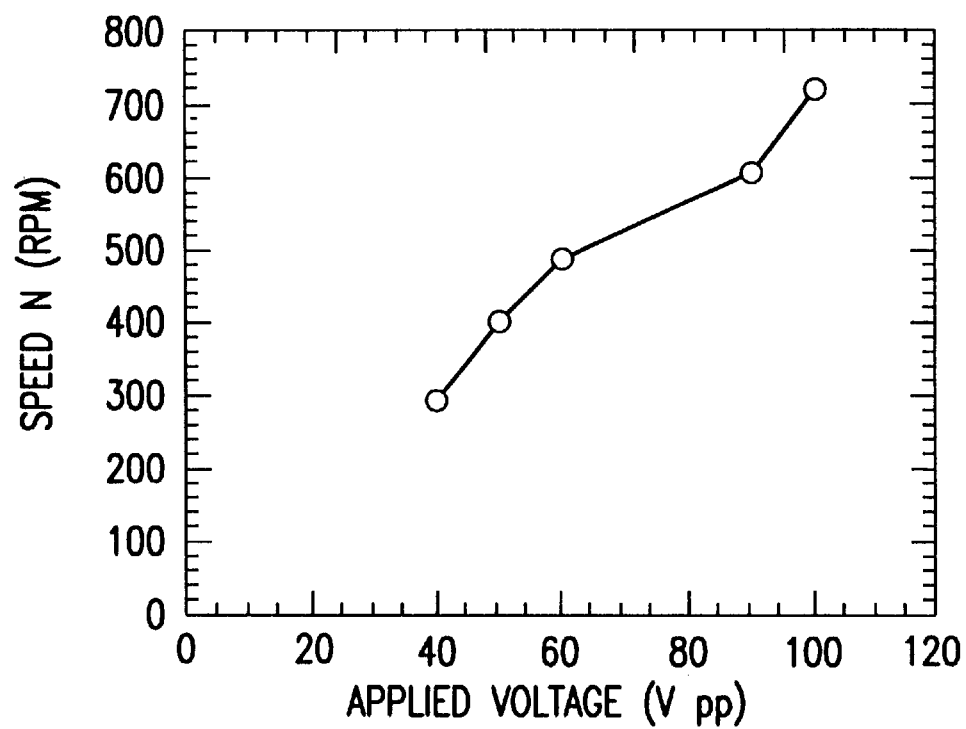
FIG. 15b shows a plot of speed vs. applied voltage for an ultrasonic motor constructed in accordance with the invention.

The resulting variation of torque with speed is shown in FIG. 15a and the variation of speed with applied voltage is shown in FIG. 15b. A linear motor structure, along the lines shown in FIGS. 7 and 8 was also constructed and the frequency applied to cause movement in one direction was 93 kHz and in the reverse direction was 110° kHz.

For a transient response measurement of the motor, a stator as shown in FIG. 11a was used, with the following dimensions:

outer diameter of the piezoelectric ring 11.0 mm
inner diameter of the piezoelectric ring 5.0 mm
thickness of the piezoelectric disk 0.7 mm
thickness of metal phosphor bronze endcap 0.15 mm
diameter of inner circular part on endcap 4.0 mm
height of the inner conical/cylindrical part on endcap 0.7 mm To measure motor torque from transient response, a metal disk (50 gram) with a relatively high moment of inertia (1.5e–5 kgm$^2$) was mounted on the rotor as a load. Then the motor was driven for different applied voltages at 130.8 KHz and the position of the rotor was recorded using a digital scope. In order to record the position of the rotor, thin aluminum foil was attached to the rotor and its position was detected by a photocell pair. This position data was recorded over a time required for the motor to reach steady state, starting from zero speed.

Figure 16:
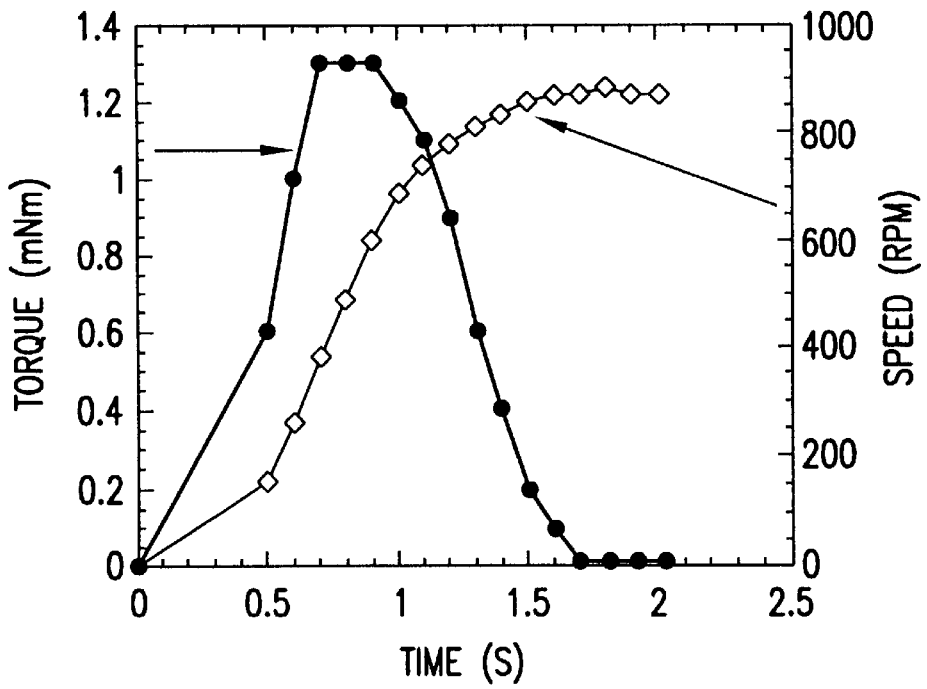
FIG. 16 is a plot of transient speed and the output torque, as a function of time, for an experimental motor constructed in accord with the invention.

The derivative of the recorded position data with respect to time gives the motor transient speed. The second derivative of the record data gives the angular acceleration; and the product of the angular acceleration and the moment of inertia of the rotating disk gives the motor transient torque. At 46 V input rms voltage, the transient speed and the output torque are shown in FIG. 16, as a function of time. At this voltage, the steady state speed reached 870 rpm in 2 seconds while the maximum motor torque read about 1.36 mNm. Similar curves were obtained for different input voltages.

Figure 17:
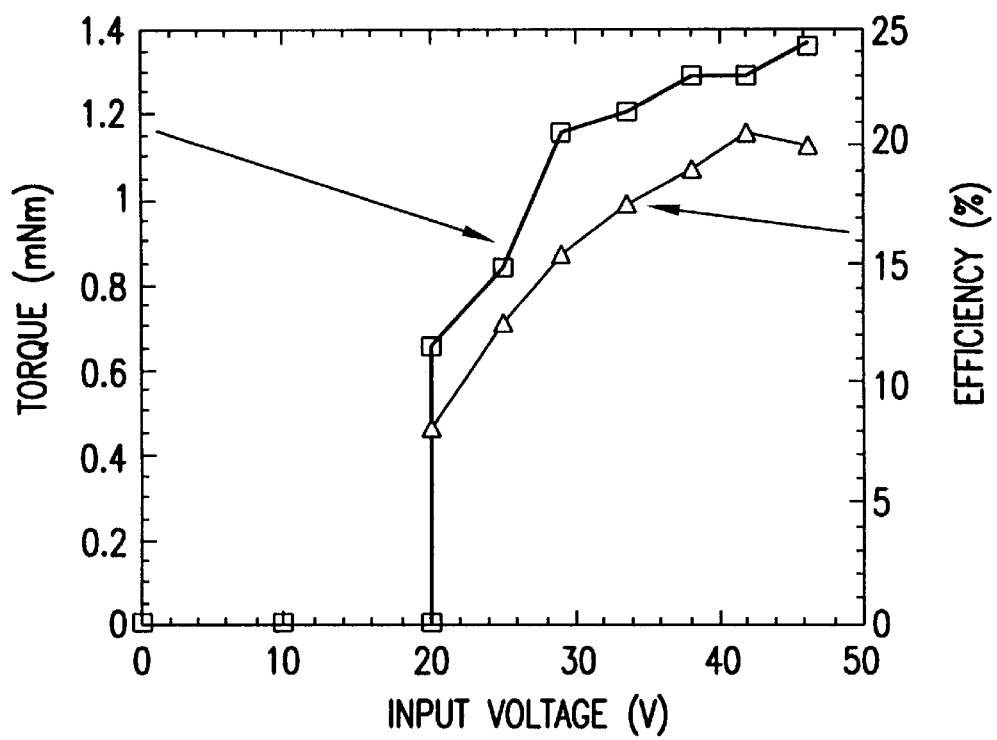
FIG. 17 is a plot of maximum torque versus input voltage for an experimental motor constructed in accord with the invention.

A plot of the maximum value of torque attained for applied rms voltages between 25 to 46 volts is shown in FIG. 17. It can be concluded, based on this plot, that in this range of applied voltage, the motor output torque increases rapidly as the input voltage increases, and tends towards saturation as the input approaches 46 V. The torque is expected to saturate beyond 46 V, but observations were not made beyond this range due to risks involving sample damage.

Figure 18:
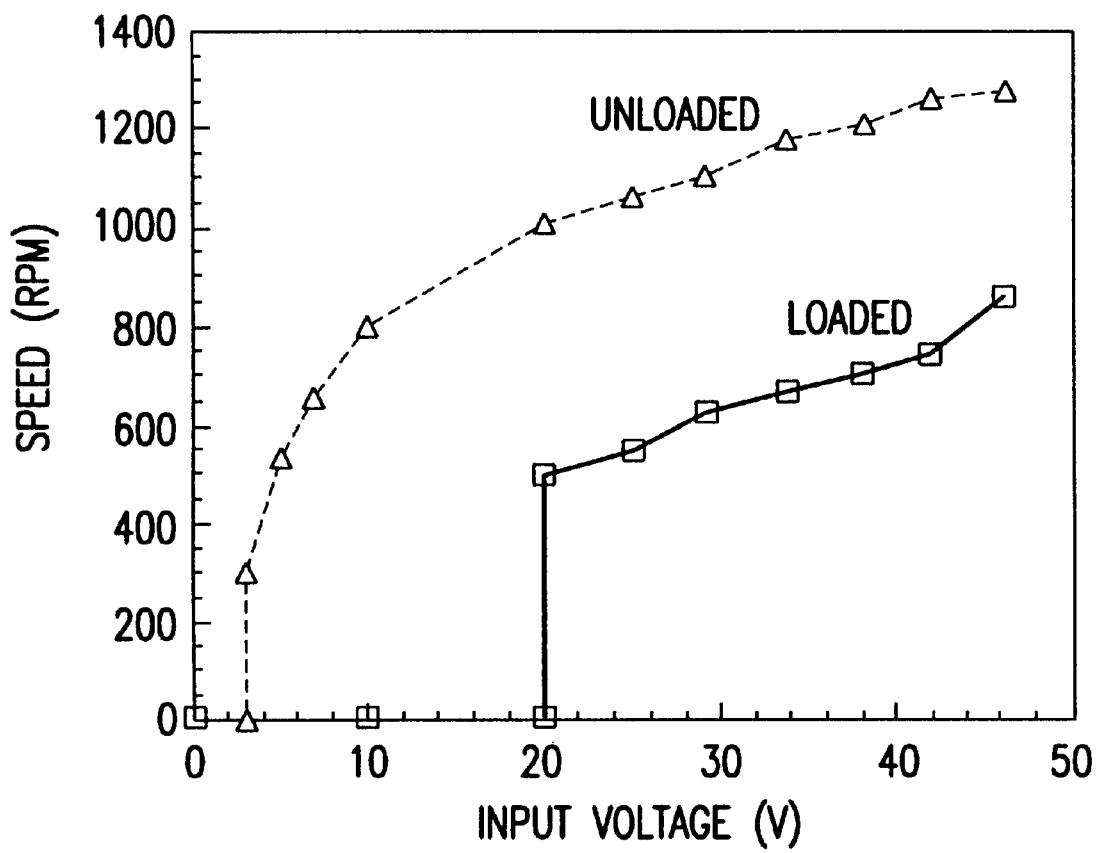
FIG. 18 is a plot of speed versus input voltage for an experimental motor constructed in accord with the invention under load and no-load conditions.

Steady state speeds, with applied voltages between 25 and 46 V, were calculated under no-load and full-load conditions, from the recorded position data. This plot is shown in FIG. 18. The obtained speed was also verified by measuring the motor speed by using an RPM meter. Hence from FIG. 18, it can be observed that no-load and full-load curves monotonically increase with the applied voltage and that the no-load curve tends to saturate towards the 46 V end. Accordingly:

i. A maximum value of torque of about 1.36 mNm was obtained at 46 rms input voltage. This torque was obtained before the motor speed reached steady state.
 ii. The motor torque steadily increased with applied input voltage, in the range of 25 and 45 volts.
 iii. The steady state speed of the motor increased within the same range of applied input voltages.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A motor comprising:
   a stator which includes:
      a piezoelectric substrate having a center of symmetry, an outer peripheral region and opposed major surfaces, said piezoelectric substrate poled so that a signal applied between said major surfaces causes movements of said peripheral region along radial directions extending from said center of symmetry;
      signal means for applying a drive signal between said major surfaces;
      a first drive cap including plural outer peripheral segments, a centrally located driving segment and arms connecting said driving segment and said outer peripheral segments, said outer peripheral segments bonded to said outer peripheral region of said piezoelectric substrate; and
   a driven segment which frictionally mates with said driving segment; and
   wherein a drive signal applied between said major surfaces of said piezoelectric substrate results in said outer peripheral segments being moved radially, causing distortions of said arms which further cause said driving segment to impart rotary movement to said driven segment via frictional engagement therewith.

2. The motor as recited in claim 1, further comprising:
   a second drive cap positioned on an opposing side of said piezoelectric substrate from said first drive cap and including plural outer peripheral segments, a centrally located segment and arms connecting said centrally located segment and said outer peripheral segments, said outer peripheral segments bonded to said outer peripheral region of said piezoelectric substrate.

3. The motor as recited in claim 1, wherein said driven segment comprises a rotor having a concave fitting with an interior shape adapted to mate with a convex shape and said driving segment is in a form of said convex shape.

4. The motor as recited in claim 1, wherein said driven segment comprises a pair of rails having an interior shape adapted to receive a convex shape and said driving segment is in a form of said convex shape having sides which abut said pair of rails.

5. The motor as recited in claim 1, wherein said driving segment manifests a concave shape and said driven segment is in a form of a convex shape which mates with said concave shape.

6. The motor as recited in claim 1, wherein said arms which extend between said plural outer peripheral segments and said centrally located driving segment are affixed to said driving segment in a manner that is generally tangential to a peripheral edge thereof so as to impart rotary motion to said driving segment when said distortions of said arms are experienced.

7. The motor as recited in claim 1, wherein said signal means applies a pulsed signal which causes repetitive, reciprocating movements of said peripheral region of said piezoelectric substrate along said radial directions.

8. The motor as recited in claim 1, wherein said piezoelectric substrate is an annular in shape.

9. The motor as recited in claim 1, wherein said drive cap is comprised of a sheet metal stamping.

10. The motor as recited in claim 1, wherein said drive signal exhibits a frequency that is substantially the same as a mechanical resonant frequency of said stator.

11. A motor comprising:

a rotor;

stator means for driving said rotor and including:

a first piezoelectric ring having a center of symmetry, an outer peripheral region and opposed major surfaces, said piezoelectric ring poled in a thickness dimension;

electrode means for applying a signal between said major surfaces of said first piezoelectric ring;

a drive cap including one or more outer peripheral segments and plural drive arms extending from said one or more outer peripheral segments toward a periphery of said rotor, said one or more outer peripheral segments bonded to said outer peripheral region of said first piezoelectric ring;

a second piezoelectric ring having opposed major surfaces, a center of symmetry and an outer peripheral region on one major surface, said second piezoelectric ring poled in a thickness dimension;

electrode means for applying a signal between said major surfaces of said second piezoelectric ring;

a second drive cap including one or more outer peripheral segments and plural drive arms extending from said one or more outer peripheral segments toward a periphery of said rotor, said one or more outer peripheral segments bonded to said outer peripheral region of said second piezoelectric ring;

signal means for applying a drive signal to said electrode means; and wherein a drive signal applied between said major surfaces of said first and second piezoelectric rings results in said outer peripheral segments being moved radially, and causes said drive arms to periodically contact said periphery of said rotor to impart movement thereto.

12. The motor as recited in claim 11, wherein said drive signal exhibits a frequency that is substantially the same as a mechanical resonant frequency of said stator means.

13. The motor as recited in claim 11, wherein one major surface of said second piezoelectric ring is bonded to a major surface of said first piezoelectric ring and said second piezoelectric ring is poled in opposition to a poling of said first piezoelectric ring.

14. The motor as recited in claim 11, wherein said first piezoelectric ring and associated drive cap exhibit a first mechanical resonant frequency and said second piezoelectric ring and associated drive cap exhibit a second mechanical resonant frequency that is different from said first mechanical frequency, and wherein said drive signal is set to reflect a frequency that is substantially the same as one said resonant frequency, whereby application of said drive signal causes one said piezoelectric ring and associated drive cap to rotate said rotor and another said piezoelectric ring and associated drive cap to translate said rotor along an extended axis thereof.

15. A motor comprising:

stator means for moving a rotor and including:

a first piezoelectric ring having a center of symmetry, an outer peripheral region and opposed major surfaces, said piezoelectric ring poled in a first thickness dimension;

electrode means for applying a signal between said major surfaces of said first piezoelectric ring;

a first drive cap including one or more outer peripheral segments, a rotor receiving portion and plural drive arms extending between said one or more outer peripheral segments and said rotor receiving portion, said one or more outer peripheral segments bonded to said outer peripheral region of said first piezoelectric ring;

a second piezoelectric ring having a center of symmetry, opposed major surfaces and an outer peripheral region on one major surface, said second piezoelectric ring poled in a thickness dimension;

electrode means for applying a signal between said major surfaces of said second piezoelectric ring;

a second drive cap including one or more outer peripheral segments, a rotor receiving portion and plural drive arms extending between said one or more outer peripheral segments and said rotor receiving portion, said one or more outer peripheral segments bonded to said outer peripheral region of said second piezoelectric ring;

signal means for applying a drive signal to said electrode means; and a rotor having a disc portion, said rotor positioned in each said rotor receiving portion in a manner that said disc portion is sandwiched between said plural drive arms of each said drive cap;

wherein said first piezoelectric ring and associated drive cap exhibit a first mechanical resonant frequency and said second piezoelectric ring and associated drive cap exhibit a second mechanical resonant frequency that is different from said first mechanical resonant frequency, and wherein said drive signal reflects a frequency that is substantially the same as one said mechanical resonant frequency, and when said drive signal is applied to said major surfaces of said first and second piezoelectric rings, one said piezoelectric ring exhibits more radial distension than the other, causing drive arms associated with said one said piezoelectric ring to move said disc with greater force than drive arms associated with said other piezoelectric ring, so as to impart rotary movement to said rotor in a direction of movement of said drive arms associated with said one piezoelectric ring.

* * * * *